(12) United States Patent
Itami et al.

(10) Patent No.: US 8,497,340 B2
(45) Date of Patent: Jul. 30, 2013

(54) FLUOROSILICONE MOLD RELEASE COMPOSITION

(75) Inventors: Yasuo Itami, Osaka (JP); Hisashi Mitsuhashi, Osaka (JP); Tetsuya Masutani, Osaka (JP); Peter Cheshire Hupfield, South Glamorgan (GB); Don Lee Kleyer, Midland, MI (US)

(73) Assignees: Daikin Industries, Ltd., Osaka (JP); Dow Corning Ltd., Wales (GB)

( * ) Notice: Subject to any disclaimer, the term of this patent is extended or adjusted under 35 U.S.C. 154(b) by 856 days.

(21) Appl. No.: 12/305,738

(22) PCT Filed: Jun. 15, 2007

(86) PCT No.: PCT/JP2007/062553
§ 371 (c)(1),
(2), (4) Date: Jan. 27, 2010

(87) PCT Pub. No.: WO2007/148767
PCT Pub. Date: Dec. 27, 2007

(65) Prior Publication Data
US 2010/0126380 A1    May 27, 2010

Related U.S. Application Data

(60) Provisional application No. 60/815,527, filed on Jun. 21, 2006.

(51) Int. Cl.
*C08L 83/04* (2006.01)
*C08G 77/16* (2006.01)
*C08G 77/00* (2006.01)
*B22C 1/205* (2006.01)

(52) U.S. Cl.
USPC .................. 528/33; 556/450; 106/38.2

(58) Field of Classification Search
USPC .................. 106/38.25, 38.2; 528/33
See application file for complete search history.

(56) References Cited

U.S. PATENT DOCUMENTS

| | | | |
|---|---|---|---|
| 4,118,235 A | 10/1978 | Horiuchi et al. | |
| 4,208,312 A * | 6/1980 | Okada et al. | 524/773 |
| 4,417,024 A * | 11/1983 | Koda et al. | 524/861 |
| 4,636,324 A * | 1/1987 | Murase et al. | 252/70 |
| 5,439,962 A | 8/1995 | Yamaguchi et al. | |
| 5,681,914 A | 10/1997 | Kobayashi et al. | |
| 5,804,674 A | 9/1998 | Yamana et al. | |
| 5,830,486 A * | 11/1998 | Nanba et al. | 424/401 |
| 5,952,397 A * | 9/1999 | Fujiki et al. | 522/99 |
| 2003/0080458 A1 * | 5/2003 | Heilig et al. | 264/130 |
| 2004/0087667 A1 * | 5/2004 | Mercurio | 516/77 |
| 2007/0128127 A1 | 6/2007 | Gawtrey et al. | |

FOREIGN PATENT DOCUMENTS

| | | |
|---|---|---|
| EP | 0370689 A2 | 5/1990 |
| EP | 0972787 A1 | 1/2000 |
| EP | 0978526 A1 | 2/2000 |
| JP | 5239587 | 9/1993 |
| JP | 5242550 | 9/1993 |
| JP | 06008257 A | 1/1994 |
| JP | 06023759 A | 2/1994 |
| JP | 06321967 | 11/1994 |
| JP | 07062243 | 3/1995 |
| JP | 08120178 A | 5/1996 |
| JP | 08319424 | 12/1996 |
| JP | 200026607 | 1/2000 |
| JP | 2000026608 | 1/2000 |
| WO | 9847947 | 10/1998 |
| WO | 2005020941 A2 | 3/2005 |

OTHER PUBLICATIONS

International Search Report dated Oct. 11, 2007 pertaining to International application No. PCT/JP2007/062553.
Office Action dated Jan. 24, 2012 pertaining to Japanese Patent Application No. 2008-558563.
European Patent Application No. 07 745 552.5-1214 Office Action dated Feb. 6, 2009.
Taiwanese Application No. 096121688 Office Action dated Feb. 18, 2013.

* cited by examiner

*Primary Examiner* — Pegah Parvini
(74) *Attorney, Agent, or Firm* — Dinsmore & Shohl LLP

(57) ABSTRACT

Disclosed in a mold release composition comprising a fluorosilicone compound of the formula (I): (I) wherein R1, R2, R4, R5, R6, R7, R8 and R9 each is, the same or different, a substituted or unsubstituted alkyl group, or a substituted or unsubstituted aryl group, R3 and R10 each is; the same or different, a substituted or unsubstituted alkyl group, or a substituted or unsubstituted aryl group, or Rf—X—, or Z—Y— in which X and Y each is; the same or different, a divalent organic group, Rf is a C1-6 fluoroalkyl group, Z is a silyl group containing a hydrolyzable site, m is 1-100, n is 1-50, and o is 0-200. The mold release composition can give excellent mold releasability and durability of mold releasability (repeated mold releasability).

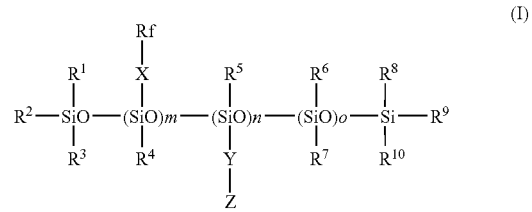

9 Claims, No Drawings

FLUOROSILICONE MOLD RELEASE COMPOSITION

TECHNICAL FIELD

The present invention relates to a fluorosilicone composition. Particularly it relates to a mold release composition excellent in mold releasability and in durability of mold releasability, which contains fluorosilicone having a short chain fluoroalkyl group.

BACKGROUND ART

Hitherto, both of a fluorocompound and a silicone compound have been used as a mold release agent for molding various rubbers and resins. For example, as the silicone compound, known are straight silicone oils, various modified silicone oils, silicone resins and the like, and as the fluorocompound, known are perfluoroalkyl group-containing phosphate ester compounds and the like. Further, the silicone compound and the fluorocompound can be mixed to improve the mold releasability (cf. Patent Document 1 and Patent Document 2).

Conventionally used fluorocompounds mainly were a compound having 8 or more carbon atoms in the fluoroalkyl chain. Recently concern that fluorocompounds having at least 8 carbon atoms in the perfluoroalkyl chain are environmentally persistent due to difficult decomposition and high accumulation. Therefore, a fluorocompound having a short fluoroalkyl chain which has low environmental persistence is sought.

A fluorosilicone compound having both of a silicone moiety and a fluorine moiety in the molecule is also known. Patent Document 3 describes a fluorosilicone compound which is one component in a composition forming a curable silicone film exhibiting water- and oil-repellency, but Patent Document 3 does not describe the use of the fluorosilicone compound alone or the mold releasability.

Patent Document 4 describes that a fluorosilicone oil having a different structure has mold releasability, but the fluorosilicone oil has the problem that the performances thereof are not sufficient.

Patent Document 1: JP-A-52-39587

Patent Document 2: JP-A-52-42550

Patent Document 3: JP-A-08-319424

Patent Document 4: JP-A-2000-26608

DISCLOSURE OF INVENTION

The present invention provides a solution to the above-mentioned problems by providing a fluorosilicone mold release composition with excellent mold releasability and durability of mold releasability (repeated mold releasability).

The present inventors intensively studied the above-mentioned problems and subsequently discovered that a fluorosilicone compound of the below-mentioned formula (I) exhibits excellent mold releasability and durability thereof to complete the present invention.

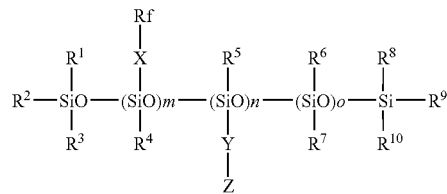

wherein $R^1$, $R^2$, $R^4$, $R^5$, $R^6$, $R^7$, $R^8$ and $R^9$ each is, the same or different, a substituted or unsubstituted alkyl group, or a substituted or unsubstituted aryl group, $R^3$ and $R^{10}$ each is, the same or different, a substituted or unsubstituted alkyl group, a substituted or unsubstituted aryl group, Rf—X—, or Z—Y—, X and Y each is, the same or different, a divalent organic group, Rf is a $C_{1-6}$ fluoroalkyl group, Z is a silyl group containing a hydrolyzable site, m is 1-100, n is 1-50, and o is 0-200.

BEST MODE FOR CARRYING OUT THE INVENTION

The present invention provides a mold release composition comprising a fluorosilicone compound of the formula (I). Herein, the composition means a single product or a mixture of at least two products.

$R^1$ to $R^{10}$ are preferably a $C_{1-20}$, more preferably $C_{1-12}$, substituted or unsubstituted alkyl group, or $C_{6-20}$, more preferably $C_{6-12}$, substituted or an unsubstituted aryl group. The alkyl group may be substituted with a halogen atom such a chlorine atom. The aryl group may be substituted with a halogen atom such a chlorine atom or a $C_1$-$C_{10}$ alkyl group such as a methyl group. Examples of $R^1$ to $R^{10}$ are include an unsubstituted alkyl group such as a methyl group, an ethyl group, a propyl group, a hexyl group and a dodecyl group; a substituted alkyl group such as a chloromethyl group; an unsubstituted aryl group such as a phenyl group and a naphtyl group; a substituted aryl group such as a 4-chlorophenyl group and a 2-methylphenyl group. Among them, the alkyl group, particularly the unsubstituted alkyl group, is preferable and the methyl group is more preferable.

But $R^3$ and $R^{10}$ may be Rf-X— or Z—Y—, in which X and Y each is; the same or different, a divalent organic group, Rf is a $C_{1-6}$ fluoroalkyl group, and Z is a silyl group containing hydrolyzable site.

X and Y are preferably a $C_{1-20}$, more preferably $C_{1-12}$, divalent organic group. Examples of the divalent organic group include an (preferably $C_{1-12}$) alkylene group such as an ethylene group, a propylene group, a methylethylene group, an octylene group and a decylene group; and an (preferably $C_{2-12}$) alkyleneoxyalkylene group such as an ethyleneoxymethylene group, a propyleneoxymethylene group, a propyleneoxyethylene group and an ethyleneoxybutylene group. In addition, X may be an (preferably $C_{1-12}$) alkylene amide group such as an ethylene amide group, a propylene amide group and a decylene amide group. Preferably, X and Y are —(CH$_2$)$_r$— in which r is an integer of 2 to 20, particularly 2 to 12.

Rf is an fluoroalkyl, preferably a perfluoroalkyl group, having 1 to 6 carbon atoms, for example, 1 to 5 carbon atoms, particularly 1 to 4 carbon atoms. Examples of Rf are a trifluoromethyl group, a pentafluoroethyl group, a 1,1,2,2-tetrafluoroethyl group, a 2-trifluoromethyl-perfluoroethyl group, a perfluorobutyl group, a perfluoropentyl group and a perfluorohexyl group. The pentafluoroethyl group is preferable.

Z is a silyl group containing a hydrolyzable site which may have 1 to 60 carbon atoms. Z may be —Si($R^{11}$)$_q$(X')$_{3-q}$ ($R^{11}$ is an alkyl group having 1 to 20 carbon atoms, preferably 1 to 4 carbon atoms, X' is a hydrolyzable site, and q is 0, 1 or 2.). Also Z may be —(Si($R^{11}$)$_2$O)$_r$—Si($R^{11}$)$_q$(X')$_3$ ($R^{11}$ is an alkyl group having 1 to 20 carbon atoms, preferably 1 to 4 carbon atoms, X' is a hydrolyzable site, and r is 1 to 200). $R^{11}$ may be a methyl group, an ethyl group, a propyl group, a hexyl group or a dodecyl group, and most preferable is a methyl group. Examples of X' which is the hydrolyzable site include a halogen such as chlorine and bromine; an alkoxy group (preferably having 1 to 12 carbon atoms) such as a methoxy group, an ethoxy group, a propoxy group, methoxyethoxy group and a butoxy group; an acyloxy group (preferably having 1 to 12 carbon atoms) such as an acetoxy group, a propionyloxy group and a benzoyloxy group; an alkenyloxy group such as an isopropenyloxy group and an isobutenyloxy group; an iminooxime group (preferably having 1 to 12 carbon atoms) such as a dimethyl ketoxime group, a methylethyl ketoxime group, a diethyl ketoxime group and a cyclohexane oxime group; a substituted amino group (preferably having 1 to 12 carbon atoms, and substituted with at least one alkyl group) such as an ethylamino group, a diethylamino group and a dimethylamino group; an amide group (preferably having 1 to 12 carbon atoms) such as a N-methylacetoamide group and a N-ethylacetoamide group; and a substituted amine oxy group (preferably having 1 to 12 carbon atoms, and substituted with at least one alkyl group preferably having 1 to 4) such as a dimethyl amine oxy group and a diethyl amine oxy group.

m is 1 to 100, n is 1 to 50, and o is 0 to 200. Preferably, m is 1 to 50, n is 3 to 20, and o is 0 to 100. More preferably, m is 2 to 50, n is 3 to 20, and o is 1 to 100.

Examples of the fluorosilicone of the above-mentioned formula (I) include but are not limited to the followings:

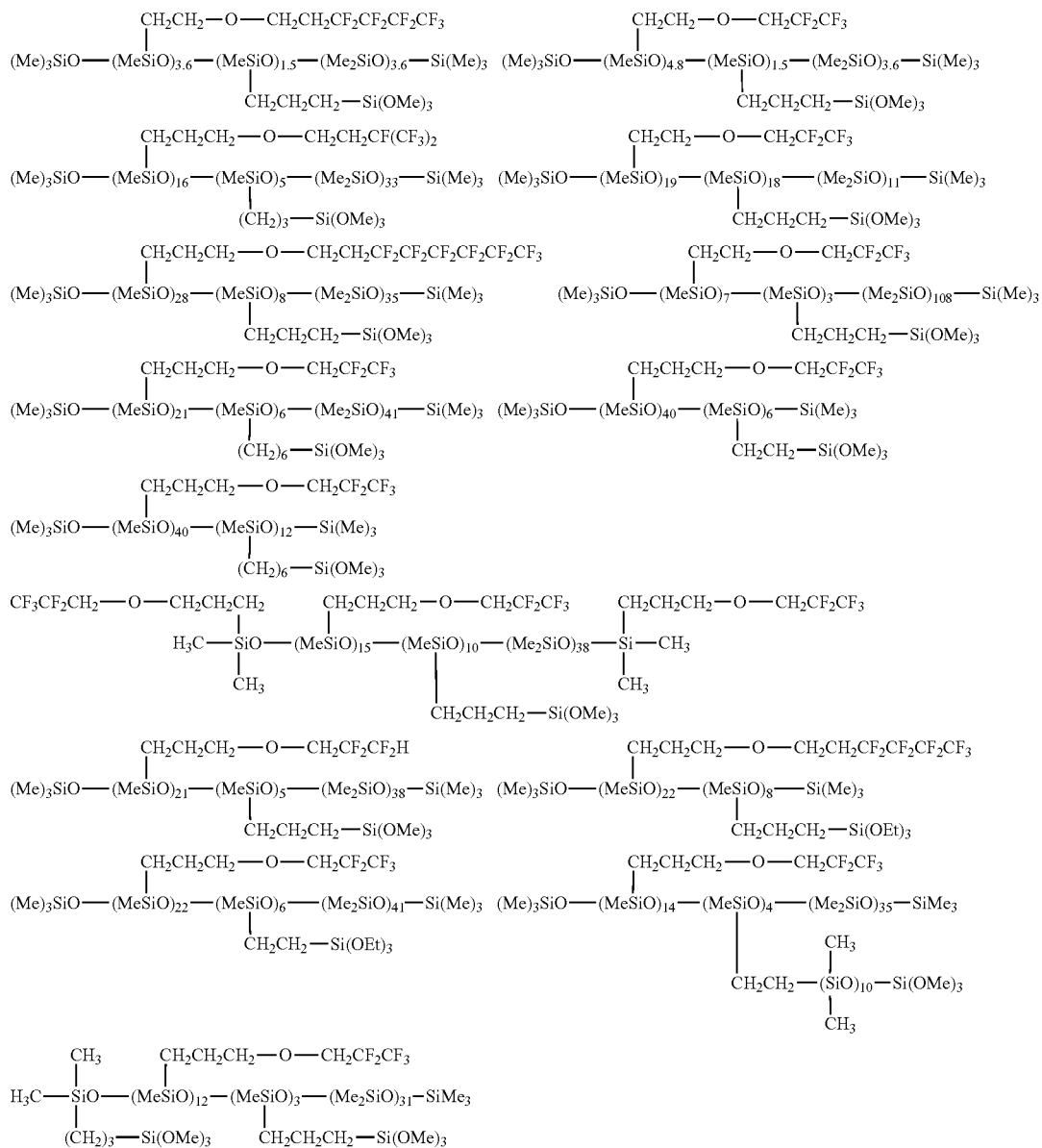

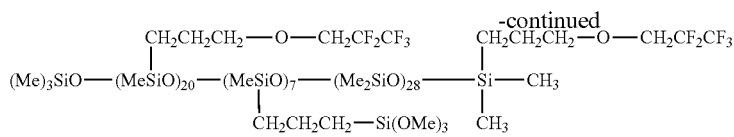

-continued

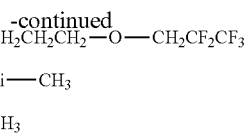

Herein, Me means a methyl group and Et means an ethyl group.

The fluorosilicone of the formula (I) can be prepared, for example, by addition-reacting an Si—H containing compound of the below-mentioned formula (II) with a compound having the formula: Rf-X"—CH=CH$_2$ or Z—Y'—CH=CH$_2$ (wherein X" and Y' each is a divalent group preferably having 1 to 18 carbon atoms, or a direct bond, and Rf and Z are the same as defined above) in the presence of a catalyst for a hydrosilylation reaction.

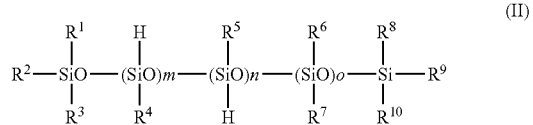

(II)

The fluorosilicone mold release composition of the present invention may contain a cure accelerating catalyst. This catalyst is to accelerate the dehydration condensation reaction of a silanol group. Examples of the cure accelerating catalyst include an organic metal salt (preferably having 1 to 30 carbon atoms) such as dibutyltin dilaurate, dibutyltin diacetate, tetrabutyl titanate (titanium butoxide), tetraisopropyl titanate (titanium isopropoxide), bis-(acetylacetonyl)-diisopropyltitanate, bis(ethyl acetoacetato)diisopropyl titanate [titanium bis(ethyl acetoacetato)diisopropoxide] and other chelates of titanium and zirconium disclosed in WO200149774 (the disclosure of which is incorporated herein by reference.), an acid (particularly an organic acid preferably having 1 to 10 carbon atoms) such as acetic acid or propionic acid, and a carboxylate salt.

The addition amount of the cure accelerating catalyst is usually at most 20 parts by weight, preferably from 0.05 to 10 parts by weight, based on 100 parts by weight of the fluorosilicone compound.

The fluorosilicone mold release composition of the present invention is preferably used in the form of a solution in a solvent such as an organic solvent. The solvent dissolves the fluorosilicone mold release composition and evaporates to deposit the fluorosilicone mold release agent. Examples of solvent include an aliphatic solvent such as hexane, cyclohexane, heptane, octane, isooctane, industrial gasoline; an aromatic solvent such as benzene, toluene and xylene; an ester solvent such as ethyl acetate and butyl acetate; an alcoholic solvent such as isopropyl alcohol and ethanol; chlorine solvent such as trichloro ethylene, chloroform and m-xylene hexachloride; a ketone solvent such as acetone and methyl ethyl ketone; an ether solvent such as diethyl ether, diisopropyl ether and tetrahydrofuran; a fluorine solvent such as HCFC-225, HFC-365, methyl perfluorobutyl ether and ethyl perfluorobutyl ether; and a low-boiling-point (which may be at most 150° C.) silicone solvent such as hexamethyldisiloxane and heptamethyltrisiloxane.

The fluorosilicone mold release composition of the present invention may be in the form of an aerosol prepared by filling a solution of the fluorosilicone compound with a propellant such as LPG.

The fluorosilicone mold release composition of the present invention can be coated by a usually known procedure. For example, a mold is immersed in a diluted liquid of the mold release composition, sprayed with the diluted liquid or coated by a brush with the diluted liquid, and then the solvent is evaporated off. Thereafter, the mold is heated to hydrolyze and condense the silyl group moiety so as to form a cured film, thereby improving the durability. The heating is preferably conducted at 50 to 200° C. for about 10 minutes to about 60 minutes.

The fluorosilicone mold release composition of the present invention can be used in the form of a mixture with another mold release component. Examples of the other mold release component include a natural wax such as a carnauba wax and a bees wax; a synthesis wax such as Fischer-Tropsch wax, a polyethylene wax and a hardened castor oil; various silicone oils and silicone resins; a fluoroil such as a CTFE oil and a PFPE oil; and a fluororesin such as PTFE and PCTFE. The amount of the other mold release component may be from 1 part by weight to 1,000 parts by weight, based on 100 parts by weight of the fluorosilicone compound (I).

Examples of a raw material for a shaped article released from the mold in the present invention include polyurethane, a butyl rubber, a styrene butadiene rubber, a chloroprene rubber, EPDM, NBR, ACM, a urethane rubber, a silicone rubber, a fluororubber, polycarbonate, an epoxy resin, a phenol resin, non-saturated polyester, melamine, FRP, PVC, ABS, EVA, and PP.

Examples of applications in the present invention include keypads, O-rings, packings, belts, panels and hoses.

Hereinafter the present invention is illustrated by the following Examples.

In the Examples, "parts" and "%" mean "parts by weight" and "% by weight", unless specified.

SYNTHESIS EXAMPLE 1

A 250 mL, 4 neck round bottom flask was equipped with mechanical stirrer, thermometer/temperature controller, heating mantle, water cooled reflux condenser with CaSO$_4$ filled drying tube and addition funnel. A siloxane, 49.97 g, of average structure Me$_3$SiO-(Me$_2$SiO)$_{38}$-(MeHSiO)$_{26}$-SiMe$_3$ was added to the flask and heated to 80° C. before the addition of 48.58 g of F$_3$CCF$_2$CH$_2$OCH$_2$CH=CH$_2$ containing 17 mg Pt as a complex with 1,2-divinyltetramethyldisiloxane. The drop-wise addition was completed in 28 minutes and was immediately followed by the drop-wise addition of 28.62 g of allyltrimethoxysilane over 7 minutes. Excess olefin was removed by heating under vacuum. Compound 1 was obtained.

SYNTHESIS EXAMPLE 2

The same procedure as in Synthesis Example 1 was repeated except that CF$_3$CF$_2$CF$_2$CF$_2$CH$_2$CH$_2$OCH$_2$CH=CH$_2$ was used instead of the pentafluoropropyl allyl ether, to give Compound 2.

SYNTHESIS EXAMPLES 3 to 6

In the same procedure as in Synthesis Example 1 with modification of raw material(s), Compounds 3 to 6 were produced.

SYNTHESIS EXAMPLES 7 and 8

In the same procedure as in Synthesis Example 1 with modification of raw material(s), Comparative Compound 1 having no A moiety and Comparative Compound 2 having no B moiety were produced.

EXAMPLE 1

A mold release test was conducted by using totally nine compounds, that is, Compounds 1 to 6 and Comparative Compounds 1 and 2 prepared in Synthesis Examples 1 to 8, and, commercially available, a fluorine-containing mold release agent, DAIFREE GF-6030 (manufactured by Daikin Industries Ltd.) (Comparative Compound 3).

The results are shown in Table 1.

<Test Method>

A solution prepared by diluting a mold release composition with HFC-365 to a solid content of 3 mass % is coated with a brush on a one side of an aluminum mold having a diameter of 7 cm and a depth of 3 cm, and dried at room temperature (23° C.) for one hour so that a non-volatile of 0.2-0.3 mg/cm$^2$ remains on the metal surface. Then, the below-mentioned A and B liquids for semi-rigid urethane foam are mixed with stirring, and immediately poured into the above-mentioned aluminum mold. The liquids are cured at room temperature (23° C.) for 10 minutes, and a shaped article is demolded while a peel strength, deriving a mold strength, is measured by a tensile tester (SHIMADZU Autograph DSC-50M, manufactured by Shimadzu Corporation, Tensile rate; 25 mm/minute). The articles are continuously demolded by using the same mold, thereby measuring the number of continuous demoldings (that is, release times) until the release becomes impossible.

<Composition of Semi-Rigid Urethane Foam>

| Liquid A | |
|---|---|
| SUMIPHEN 3900 (Polyol, manufactured by Sumika Bayer Urethane Co., Ltd.) | 90 parts |
| Water (Blowing agent) | 1.6 parts |
| Triethanol amine (Catalyst) | 3 parts |
| Triethyl amine (catalyst) | 0.5 parts |
| KAOLIZER No. 1 (Foam controlling agent, manufacture by Kao Corporation) | 0.5 parts |
| Liquid B | |
| SUMIDUR 44V20 (Polyisocyanate, manufactured by Sumika Bayer Urethane Co., Ltd.) | 41.3 parts |

TABLE 1

$$(Me)_3SiO\text{---}(MeSiO)x\overset{A}{|}\text{---}(MeSiO)y\overset{B}{|}\text{---}(Me_2SiO)z\text{---}Si(Me)_3$$

| | A | x | B | y | z | Tensile strength in 1st release test (g/cm2) | Release times |
|---|---|---|---|---|---|---|---|
| Compound 1 | —(CH$_2$)$_3$OCH$_2$CF$_2$CF$_3$ | 21 | —(CH$_2$)$_3$Si(OCH$_3$)$_3$ | 5 | 38 | 19 | 9 |
| Compound 2 | —(CH$_2$)$_3$OCH$_2$CH$_2$CF$_2$CF$_2$CF$_2$CF$_3$ | 22 | —(CH$_2$)$_3$Si(OCH$_3$)$_3$ | 8 | 0 | 23 | 10 |
| Compound 3 | —(CH$_2$)$_3$OCH$_2$CF$_2$CF$_3$ | 28 | —(CH$_2$)$_3$Si(OCH$_3$)$_3$ | 8 | 35 | 22 | 8 |
| Compound 4 | —(CH$_2$)$_3$OCH$_2$CF$_2$CF$_3$ | 28 | —(CH$_2$)$_3$Si(OCH$_3$)$_3$ | 7 | 0 | 27 | 9 |
| Compound 5 | —(CH$_2$)$_3$OCH$_2$CF$_2$CF$_3$ | 30 | —(CH$_2$)$_3$Si(OCH$_3$)$_3$ | 7 | 86 | 18 | 9 |
| Compound 6 | —(CH$_2$)$_3$OCH$_2$CF$_2$CF$_3$ | 30 | —(CH$_2$)$_3$Si(OCH$_3$)$_3$ | 10 | 27 | 18 | 8 |
| Comparative Compound 1 | —(CH$_2$)$_3$OCH$_2$CF$_2$CF$_3$ | 25 | — | 0 | 39 | 109 | 2 |
| Comparative Compound 2 | — | 0 | —(CH$_2$)$_3$Si(OCH$_3$)$_3$ | 7 | 65 | 76 | 1 |
| Comparative Compound 3 | | | | | | 24 | 8 |

EXAMPLE 2

1% of the below-mentioned catalyst was added to Compounds 1 to 6 and Comparative Compounds 1 to 3 used in Example 1, and then, in the same as in Example 1, the mold release composition was coated on the mold and dried at 150° C. for 30 minutes.

The used catalyst was two types, that is, tetraisopropyl titanate (titanium isopropoxide) and bis(ethyl acetoacetato) diisopropyl titanate [titanium bis(ethyl acetoacetato)diisopropoxide].

After the shaped material was cooled, the mold release test on the semi-rigid urethane foam was conducted as in Example 1. The continuous release times were measured for the same mold.

The results are shown in Table 2.

TABLE 2

| | Release times | | |
|---|---|---|---|
| | Without catalyst | Titanium isopropoxide | Titanium bis(ethyl acetoacetato) diisopropoxide |
| Compound 1 | 9 | 13 | 13 |
| Compound 2 | 10 | 14 | 14 |
| Compound 3 | 8 | 13 | 14 |
| Compound 4 | 9 | 13 | 13 |
| Compound 5 | 9 | 14 | 14 |
| Compound 6 | 8 | 12 | 13 |
| Comparative Compound 1 | 2 | 2 | 2 |
| Comparative Compound 2 | 1 | 2 | 2 |
| Comparative Compound 3 | 8 | 10 | 10 |

The invention claimed is:

1. A mold release composition comprising a fluorosilicone compound of the formula (I):

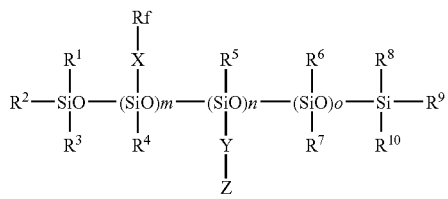

wherein
R$^1$, R$^2$, R$^4$, R$^5$, R$^6$, R$^7$, R$^8$ and R$^9$ each is, the same or different, a substituted or unsubstituted alkyl group, or a substituted or unsubstituted aryl group,
R$^3$ and R$^{10}$ each is, the same or different, a substituted or unsubstituted alkyl group, a substituted or unsubstituted aryl group, Rf—X—, or Z—Y—,
X is an alkyleneoxyalkylene group,
Y a divalent organic group,
Rf is a pentafluoroethyl group,
Z is a silyl group containing a hydrolyzable site,
m is from 1 to 100, n is from 1 to 50, and o is from 0 to 200.

2. The mold release composition according to claim 1, wherein, in the formula (I), Z is —Si(R$^{11}$)$_q$(OR$^{12}$)$_{3-q}$ in which R$^{11}$ and R$^{12}$ each is, the same or different, an alkyl group having 1 to 4 carbon atoms, and q is 0, 1 or 2.

3. The mold release composition according to claim 1, wherein, in the formula (I), Y is —(CH$_2$)$_r$— in which r is an integer of 2 to 20.

4. The mold release composition according to claim 1, which further contains a curing accelerating catalyst in the amount of 0.05 parts by weight to 10 parts by weight, based on 100 parts by weight of the fluorosilicone compound (I).

5. The mold release composition according to claim 1, which further contains at least one selected from the group consisting of a silicone oil, a silicone resin, a synthesis wax, a natural wax, a fluorooil and a fluororesin in the amount of 0.1 to 99 parts by weight, based on 100 parts by weight of the fluorosilicone compound (I).

6. A mold release agent comprising a solution of the composition according to claim 1 in an organic solvent.

7. An aerosol comprising the mold release agent according to claim 6 filled with a propellant.

8. A fluorosilicone compound of the formula (I):

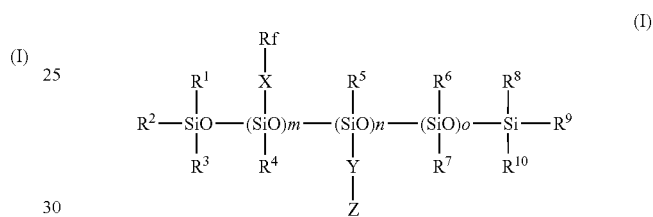

wherein
R$^1$, R$^2$, R$^4$, R$^5$, R$^6$, R$^7$, R$^8$ and R$^9$ each is, the same or different, a substituted or unsubstituted alkyl group, or a substituted or unsubstituted aryl group,
R$^3$ and R$^{10}$ each is, the same or different, a substituted or unsubstituted alkyl group, a substituted or unsubstituted aryl group, Rf—X—, or Z—Y—,
X is an alkyleneoxyalkylene group,
Y a divalent organic group,
Rf is a pentafluoroethyl group,
Z is a silyl group containing a hydrolyzable site,
m is from 1 to 100, n is from 1 to 50, and o is from 0 to 200.

9. The mold release composition according to claim 1, wherein o is 1 to 200.

* * * * *

UNITED STATES PATENT AND TRADEMARK OFFICE
CERTIFICATE OF CORRECTION

PATENT NO.         : 8,497,340 B2
APPLICATION NO.    : 12/305738
DATED              : July 30, 2013
INVENTOR(S)        : Yasuo Itami et al.

It is certified that error appears in the above-identified patent and that said Letters Patent is hereby corrected as shown below:

On the Title Page

Item (57)                              "ABSTRACT
Disclosed in a mold release composition comprising a fluorosilicone compound of the formula (I): (I) wherein R1, R2, R4, R5, R6, R7, R8 and R9 each is, the same or different, a substituted or unsubstituted alkyl group, or a substituted or unsubstituted aryl group, R3 and R10 each is; the same or different, a substituted or unsubstituted alkyl group, or a substituted or unsubstituted aryl group, or Rf-X-, or Z-Y- in which X and Y each is; the same or different, a divalent organic group, Rf is a C1-6 fluoroalkyl group, Z is a silyl group containing a hydrolyzable site, m is 1-100, n is 1-50, and o is 0-200. The mold release composition can give excellent mold reusability and durability of mold releasability (repeated mold releasability)."

should read:

Item (57)                              --ABSTRACT
Disclosed in a mold release composition comprising a fluorosilicone compound of the formula (I): (I) wherein $\mathbf{R^1}$, $\mathbf{R^2}$, $\mathbf{R^4}$, $\mathbf{R^5}$, $\mathbf{R^6}$, $\mathbf{R^7}$, $\mathbf{R^8}$ and $\mathbf{R^9}$ each is, the same or different, a substituted or unsubstituted alkyl group, or a substituted or unsubstituted aryl group, $\mathbf{R^3}$ and $\mathbf{R^{10}}$ each is; the same or different, a substituted or unsubstituted alkyl group, or a substituted or unsubstituted aryl group, or Rf-X-, or Z-Y- in which X and Y each is; the same or different, a divalent organic group, Rf is a C1-6 fluoroalkyl group, Z is a silyl group containing a hydrolyzable site, m is 1-100, n is 1-50, and o is 0-200. The mold release composition can give excellent mold releasability and durability of mold releasability (repeated mold releasability).--.

In the Claims

Col. 9, Claim 1, Line 42, "Y a" should read --Y is a--; and

Col. 10, Claim 8, Line 40, "Y a" should read --Y is a--.

Signed and Sealed this
Twenty-second Day of July, 2014

Michelle K. Lee
*Deputy Director of the United States Patent and Trademark Office*